(12) United States Patent
Bullen et al.

(10) Patent No.: US 10,281,343 B2
(45) Date of Patent: May 7, 2019

(54) METHOD AND APPARATUS FOR MEASURING A PEAK LOAD

(71) Applicant: United States Department of Energy, Washington, DC (US)

(72) Inventors: David A. Bullen, North Huntingdon, PA (US); Brian A. McGraw, Pittsburgh, PA (US)

(73) Assignee: U.S. Department of Energy, Washington, DC (US)

( * ) Notice: Subject to any disclaimer, the term of this patent is extended or adjusted under 35 U.S.C. 154(b) by 185 days.

(21) Appl. No.: 15/175,110

(22) Filed: Jun. 7, 2016

(65) Prior Publication Data

US 2017/0122819 A1 May 4, 2017

Related U.S. Application Data

(60) Provisional application No. 62/247,479, filed on Oct. 28, 2015.

(51) Int. Cl.
| | |
|---|---|
| *G01N 11/00* | (2006.01) |
| *G01L 1/06* | (2006.01) |
| *G01B 21/32* | (2006.01) |
| *G01L 5/24* | (2006.01) |

(52) U.S. Cl.
CPC ............ *G01L 1/06* (2013.01); *G01B 21/32* (2013.01); *G01L 5/243* (2013.01)

(58) Field of Classification Search
CPC .... G01N 3/08; G01N 3/10; G01N 2203/0085; G01N 3/00; G01N 2203/0019; G01L 1/06; G01B 21/32

USPC .......................................................... 73/823
See application file for complete search history.

(56) References Cited

U.S. PATENT DOCUMENTS

| | | | | |
|---|---|---|---|---|
| 2,691,886 | A * | 10/1954 | Cole ..................... | G01N 3/08 73/823 |
| 3,638,478 | A * | 2/1972 | Dietert ................. | G01N 3/10 73/38 |
| 4,090,399 | A * | 5/1978 | Babcock .............. | G01B 5/30 116/DIG. 34 |
| 4,649,854 | A * | 3/1987 | Janke ................... | G01K 5/70 116/215 |
| 5,232,664 | A * | 8/1993 | Krawzak ............. | G01N 35/1002 422/523 |
| 5,520,057 | A * | 5/1996 | Nakamura ........... | G01L 5/0085 73/785 |
| 5,756,907 | A * | 5/1998 | Senda .................. | G01N 3/08 73/38 |

(Continued)

*Primary Examiner* — Natalie Huls
*Assistant Examiner* — Mohammed E Keramet-Amircolai
(74) *Attorney, Agent, or Firm* — Robert T. Burns; Jennifer R. Mahalingappa; Brian J. Lally

(57) ABSTRACT

The present subject matter discloses a method of measuring a peak load, including the steps of placing an indenter between a first surface and a second surface, exerting a load on at least one of the first and second surfaces, measuring at least one of a width, depth, radial chord length, and cross-sectional area of an indentation formed by the indenter in at least one of the first and second surfaces; and converting the measured parameter into a load value. Certain methods further include the steps of converting the measured parameter into a load per length value and obtaining a load value by integrating along a circumferential length of the indentation. In still other methods, the exerted load is a compressive load.

21 Claims, 11 Drawing Sheets

(56) References Cited

U.S. PATENT DOCUMENTS

| | | | | |
|---|---|---|---|---|
| 5,821,695 A * | | 10/1998 | Vilanilam | F21V 25/12 315/58 |
| 5,877,428 A * | | 3/1999 | Scolton | G01N 3/08 73/822 |
| 6,134,947 A * | | 10/2000 | Kwun | G01L 1/14 280/735 |
| 7,964,098 B2 * | | 6/2011 | Willliams | B01L 3/50825 210/232 |
| 8,272,255 B2 * | | 9/2012 | Halverson | G01N 1/18 422/527 |
| 8,535,945 B2 * | | 9/2013 | Halverson | B01L 3/5021 210/324 |
| 8,563,264 B2 * | | 10/2013 | Halverson | G01N 1/38 435/30 |
| 8,569,072 B2 * | | 10/2013 | Halverson | G01N 1/38 422/400 |
| 8,647,508 B2 * | | 2/2014 | Halverson | G01N 1/4077 210/257.2 |
| 8,647,574 B2 * | | 2/2014 | Halverson | G01N 1/38 210/516 |
| 8,685,746 B2 * | | 4/2014 | Halverson | G01N 1/38 422/400 |
| 8,991,270 B2 * | | 3/2015 | Stallinga | G01N 15/0625 73/863.02 |
| 9,470,612 B2 * | | 10/2016 | Rajagopal | B01L 3/5021 |
| 9,488,563 B2 * | | 11/2016 | Halverson | B01L 3/5021 |
| 2004/0038425 A1 * | | 2/2004 | Ferguson | G01N 1/18 436/177 |
| 2005/0178211 A1 * | | 8/2005 | Thom | G01N 3/08 73/820 |
| 2006/0013670 A1 * | | 1/2006 | Sullivan | F16B 39/24 411/155 |
| 2007/0056375 A1 * | | 3/2007 | Akdeniz | G01L 5/243 73/649 |
| 2008/0017306 A1 * | | 1/2008 | Liu | B01F 13/0059 156/297 |
| 2009/0007691 A1 * | | 1/2009 | Park | G01N 3/10 73/803 |
| 2009/0158992 A1 * | | 6/2009 | Manahan | G08B 5/36 116/207 |
| 2010/0039256 A1 * | | 2/2010 | Manahan | H01H 9/042 340/540 |
| 2011/0200699 A1 * | | 8/2011 | Manbrini | G01N 3/32 425/169 |
| 2011/0232561 A1 * | | 9/2011 | Holloway | G08B 5/36 116/201 |
| 2014/0096598 A1 * | | 4/2014 | Halverson | B01L 3/5021 73/61.72 |
| 2014/0106397 A1 * | | 4/2014 | Rajagopal | B01L 3/5021 435/34 |

* cited by examiner

METHOD AND APPARATUS FOR MEASURING A PEAK LOAD

PRIORITY CLAIM

The present patent application claims priority to Provisional Patent Application No. 62/247,479 filed Oct. 28, 2015, the contents of which are hereby incorporated by reference in their entirety.

GOVERNMENT INTEREST STATEMENT

This invention was made with government support under DOE Contract No. DE-NR0000031. The government has certain rights in the invention.

BACKGROUND

Field

This present subject matter relates generally to an apparatus and method for measuring tensile load.

Discussion of the Related Art

Fasteners, such as screws and bolts, are ubiquitous in machinery and structural design. In most applications, they are loaded in tension in order to place clamped components in compression and hold assemblies together. There are many ways to measure fastener tensile loads, including but not limited to fastener length measurement and load indicating devices. Most tensile load measurements fall into two categories: indicating a fastener has reached a particular tensile load, and direct measurements of an existing tensile load. More rarely, the need arises to measure a peak load experienced by a fastener exposed to a range of loads over a period of time.

Existing devices have many drawbacks, as they must be observed in the installed condition. Some rely on inks or dies to indicate a load is reached, and are unsuitable for some environmental conditions. Still others are limited to indicating when a particular tensile load is achieved, and/or indicate the magnitude of a current tensile load without retaining any information about prior loads. These and other drawbacks are solved in the exemplary embodiments described below.

SUMMARY

Disclosed is a method of measuring a peak load, including the steps of placing an indenter between a first surface and a second surface, exerting a compressive load on at least one of the first and second surfaces, measuring at least one of a width, depth, radial chord length, and cross-sectional area of an indentation formed by the indenter in at least one of the first and second surfaces; and converting the measured parameter into a load value. Certain methods further include the steps of converting the measured parameter into a load per length value and obtaining a load value by integrating along a circumferential length of the measured parameter. In still other methods, the exerted load is a compressive load.

Another disclosed method includes the steps of measuring a profile of an indentation and correlating an applied load to at least one of an indentation width, an indentation depth, an indentation length, and an indentation cross sectional area.

Also disclosed is an exemplary embodiment of a peak load indicator including a first surface having a first yield strength and a first elastic modulus, a second surface having a second yield strength and a second elastic modulus, and an indenter between the first surface and the second surface. In this exemplary embodiment, the indenter has a third yield strength greater than a greater of the first and second yield strengths, and a third elastic modulus greater than a greater of the first and second elastic moduli.

BRIEF DESCRIPTION OF THE DRAWINGS

A description of the present subject matter including various embodiments thereof is presented with reference to the accompanying drawings, the description not to be considered limiting in any matter, wherein.

Similar reference numerals and designators in the various figures refer to like elements.

DETAILED DESCRIPTION OF THE EMBODIMENTS

Figure 1:
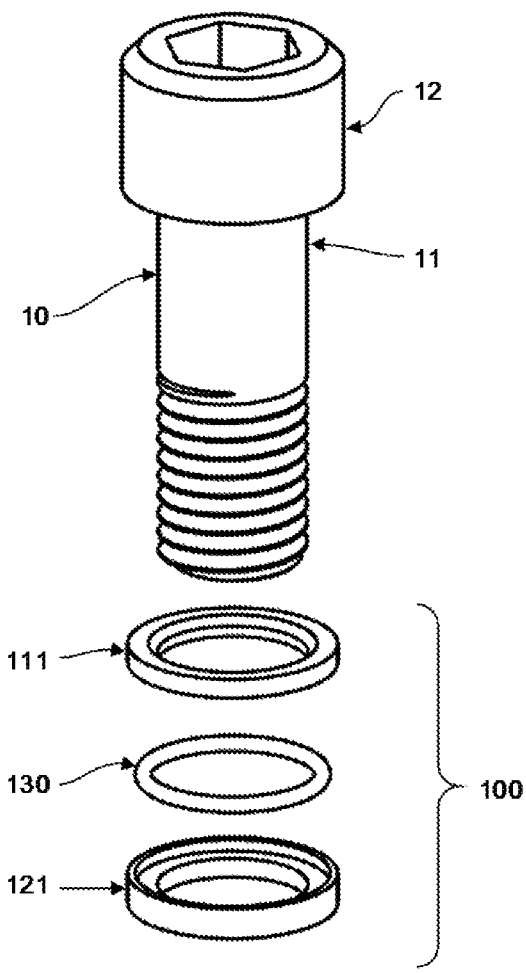
FIG. 1 illustrates an exemplary embodiment of a peak load indicator assembly.
Figure 2:
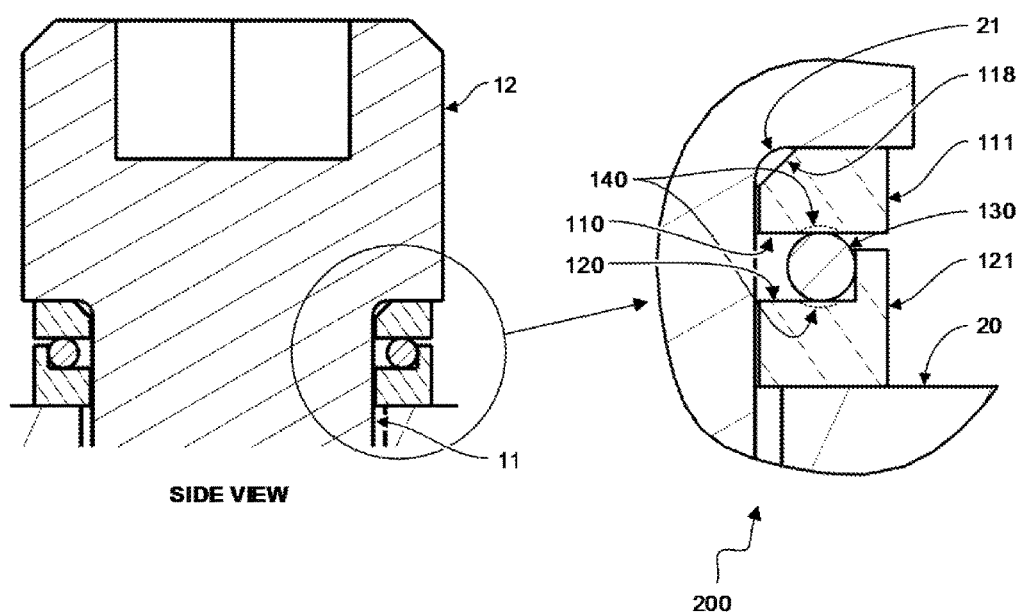
FIG. 2 illustrates a cross-sectional view of an exemplary peak load indicator assembly.

FIGS. 1 and 2 illustrate exemplary peak load indicator embodiments. FIG. 1 illustrates an exemplary embodiment of a peak load indicator assembly 100, and FIG. 2 illustrates a cross-sectional view of an exemplary peak load indicator 200. During operation of a machine or device in which certain embodiments of peak load indicators 100 are installed, fastener 10 is exposed to tensile loads carried as compressive loads through at least one of a first surface 110, a second surface 120, and an indenter 130 to clamped component 20. In certain exemplary embodiments, both first surface 110 and second surface 120 carry at least a portion of the full fastener load. In certain exemplary embodiments, first surface 110 is on a first washer 111 and second surface 120 is a on a second washer 121. Indenter 130 could be between other items (instead of or in addition to surfaces 110/120 and/or 111/121) and/or other items without departing from the scope of the present subject matter. In this embodiment, the indenter yield strength is greater than the yield strength or strengths of washers 111 and 121 and the indenter elastic modulus is equal to or greater than the elastic modulus/moduli of washers 111 and 121.

In these exemplary embodiments, stress on a surface is a function of applied load and indenter curvature. When a cylindrical surface presses against a surface with a different curvature (or no curvature), the load between surfaces creates a localized, elevated stress around the contact points of both materials. Indenters having a smaller curvature diameter result in more concentrated stresses in the washer, causing a plastic deformation at lower applied loads. In softer materials, plastic deformation occurs at a lower stress, and thus at a lower applied load.

If a stress remains below a material's yield strength, its deformation under load is elastic and it rebounds to its original shape when the load is removed. If a stress exceeds a material's yield strength, the deformation under load is both elastic and plastic, with the plastic component remaining after the load is removed. The minimum load that can be detected is the minimum load that results in a measureable plastic deformation. The maximum load that can be detected is the highest load that still results in a change in one of the indentation parameters (width, depth, area, radial chord length, and/or circumferential indentation length).

At loads high enough to cause plastic deformation, indenter 130 deforms at least one of first surface 110 and second surface 120 to form at least one indentation 140 on at least one of first surface 110 and second surface 120. The plastic component of indentation 140 remains after the load is removed. The plastic component of indentation 140 acts as a physical record of the peak load fastener 10 was exposed to. The sensitive range of a peak load indicator is the range of loads that can be uniquely identified by examining the plastic component of indentation 140. The bottom of the sensitive range is represented by the lowest load that results in a measureable indent. The top of the sensitive range is represented by the largest load in which the indent is measurably different from indents caused by smaller loads. Small loads are loads that are barely sufficient to create a measurable indentation. This could be a few lbf for items made from soft materials, up to thousands of lbf for items made from hard materials.

In the exemplary embodiment of FIG. 1, a peak load indicator 100 includes an indenter 130 between first surface 110 and second surface 120. In certain exemplary embodiments, the first surface 110 has a first yield strength and a first elastic modulus, the second surface 120 has a second yield strength and a second elastic modulus. In these exemplary embodiments, indenter 130 has a third yield strength greater than a greater of the first and second yield strengths, and a third elastic modulus greater than a greater of the first and second elastic moduli.

An indenter 130 can be fabricated by multiple methods including but not limited to wire bending, stamping, and/or cold forging. In certain exemplary embodiments, indenter 130 is made by wire bending from "bright finish" wire (not shown) with a circular cross section and diameter. In certain exemplary embodiments at least one of washers 111/121 and/or indenter 130 is fabricated from metal, but need not be. In the exemplary embodiments shown, the metal or metals is/are selected based in part on expected load(s) and the measurement environment. In exemplary embodiments including washers 111 and/or 121, the combination of yield strength and elastic modulus for indenter 130 and washers 111 and/or 121 are selected such that indenter 130 plastically indents at least one of washer 111 and 121 under load instead of indenter 130 being plastically indented. In certain embodiments materials are selected based on expected loads, test environment, fabrication concerns, or other expected conditions. In certain embodiments, materials are selected such that the washers 111/121 and/or and indenter 130 have a combination of strength and stiffness characteristics such that indenter 130 indents at least one of washers 111 and 121.

In certain exemplary embodiments, at least one of an indenter surface 131, first surface 110, and second surface 120 is smooth, with a surface roughness of 125 microinches or less. In certain embodiments, at least one of first and second surfaces 110 and 120 has a surface roughness of 32 microinches or less. In certain exemplary embodiments, at least one of first surface 110, second surface 120, and indenter 130 is coated with at least one material (not shown). In certain embodiments first surface 110 and/or second surface 120 is coated. In certain embodiments, at least one of indenter surface 131, first surface 110, and second surface 120 is plated or coated with the at least one material (not shown). The plating and/or coating provides increased corrosion or other environmental resistance. If a coating thickness less than ten times the indentation depth, the additional layer of material (not shown) does not alter the indentation characteristics of indenter surface 131, first surface 110, and second surface 120.

In still other embodiments, at least one of washers 111/121 is coated with a second material (not shown) having a yield strength and/or elastic modulus of half the yield strength and/or elastic modulus of washer 111/121 for a wider load indicator range, though other ratios can be used without departing from the scope of the present subject matter. Loads at the low end of the measurement range indent the softer material by an amount similar to the indentation that would occur if the entire washer were composed of the softer second material. At loads higher than the second material can separately measure, the stronger washer material provides additional support that allows load measurement to higher loads. The minimum measureable load is the load that leaves the minimum measureable plastic indent. The maximum measureable load is the load above which the indent characteristic being measured no longer changes. The softer coating lowers the minimum detectable load while the underlying, stronger material withstands higher loads, increasing the load measurement range.

Other materials and methods known to those of skill in art can be used without departing from the scope of the present subject matter. Certain embodiments, for example, include a high-temperature, high-pressure water environment and stainless steel 0.75×10 UNC socket head cap screws 30. In these embodiments, washers 111 and 121 are made from annealed UNS S30300 round bar per ASTM A582. The indenters 130 are fabricated by wire bending from 0.080 inch diameter, Type 302/304, spring tempered, bright finish, stainless steel wire per ASTM A313. In certain exemplary embodiments, rimmed and/or unrimmed washers 111 and 121 are made from different materials, or from the same material but with different microstructures (not shown).

If a range of potential loading (or loading temperature) is wider than one material will support, multiple materials (not shown) with overlapping hardness and/or elasticity can be used without departing from the scope of the present subject matter. If there is uncertainty about the environmental conditions that will be encountered (such as a liquid environment that could be either acidic or basic, or a gaseous environment that could be oxidizing or reducing), using multiple materials increases the likelihood that at least one material will indent as intended.

In the exemplary embodiment of FIG. 1, washer 111 is unrimmed and washer 121 has a rim 122 configured to center indenter 130 within washer 121 when installed. Washers 111 and 121 are centered on fastener 10 by an interface between a fastener body 11 and an inside diameter (ID) of at least one of washer 111 and 121. Each washer optionally includes a chamfer 118/128 from its inside diameter to a surface opposite the surface that contacts indenter 130, to provide clearance for a fillet 21 under the head of fastener 10. In certain embodiments, as shown in the exemplary embodiment of FIG. 2, the peak load indicator assembly 100 is installed on fastener 10. After fastener 10 and peak load indicator 100 are installed, washers 111 and 121 are trapped between a fastener head 12 and a clamped component 20 such that tensile loads in the fastener 10 result in a compression load on at least one of washers 111 and 121.

In the exemplary embodiments of FIGS. 1 and 2, first surface 110 and second surface 120 are flat and opposite each other on first washer 111 and second washer 121. In this configuration, fastener head forces are uniformly carried as compression loads orthogonal to surfaces 110 and 120. In certain exemplary embodiments, at least one of indenter surface 131, first surface 110, and second surface 120 are smooth to facilitate detection and/or measurement of at least one indentation 140 in at least one of first surface 110 and first surface 120 after exposure to a load. In certain exemplary embodiments, at least one of surfaces 110, 120, and 131 preferably has a surface roughness of 125 microinches or less. In certain embodiments, indentation 140 is in at least one of washer 111 and washer 121. In certain exemplary embodiments, first surface 110 and second surface 120 are parallel to each other.

Figure 3:
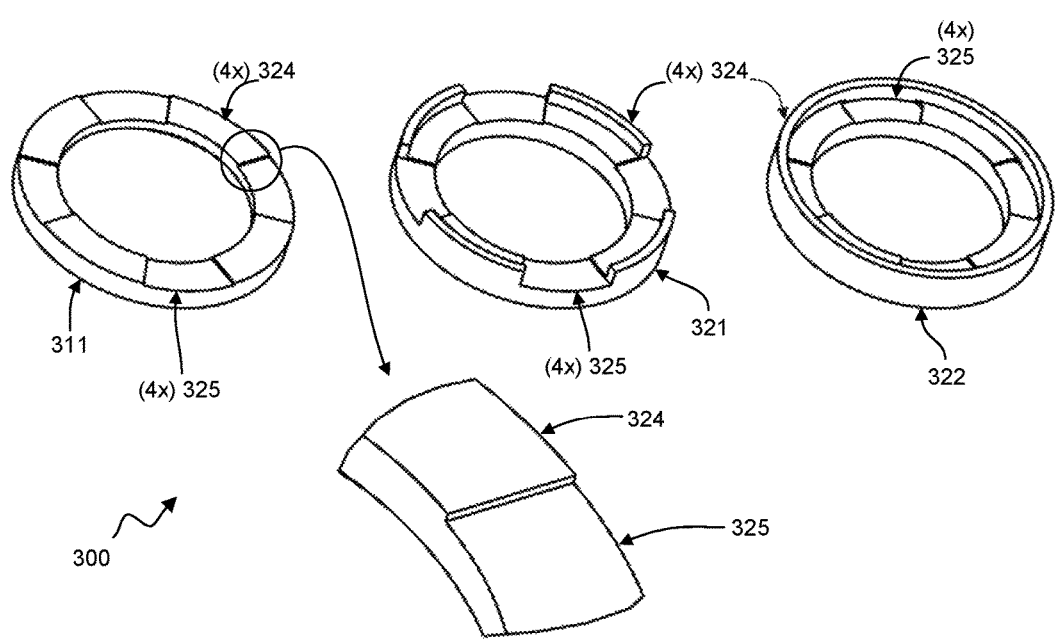
FIG. 3 illustrates exemplary embodiments of grooved washers.

FIG. 3 illustrates exemplary embodiments of grooved washers 300, including flat grooved washer 311 and rimmed grooved washers 321 and 322. In the exemplary embodiments shown, grooves 325 in the washer indentation surface 324 prevent an indenter (not shown) from contacting at least a portion of washer surface 324. The exemplary grooves 325 of FIG. 3 decrease the load carrying length of contact between the indenter and the ungrooved regions of washer 311/321/322. This concentrates load on a smaller portion of at least one first washer surface 324, leading to higher loads per unit length of the remaining indenter contact(s), resulting in higher stresses in the washer materials. This lowers the minimum detectable load level below what is detectable by ungrooved washers 111/121, and thus increases the range of detectable loads. The number, size, and location of grooves shown are exemplary only, as other numbers, sizes, and locations can be used without departing from the scope of the present subject matter.

Figure 4:
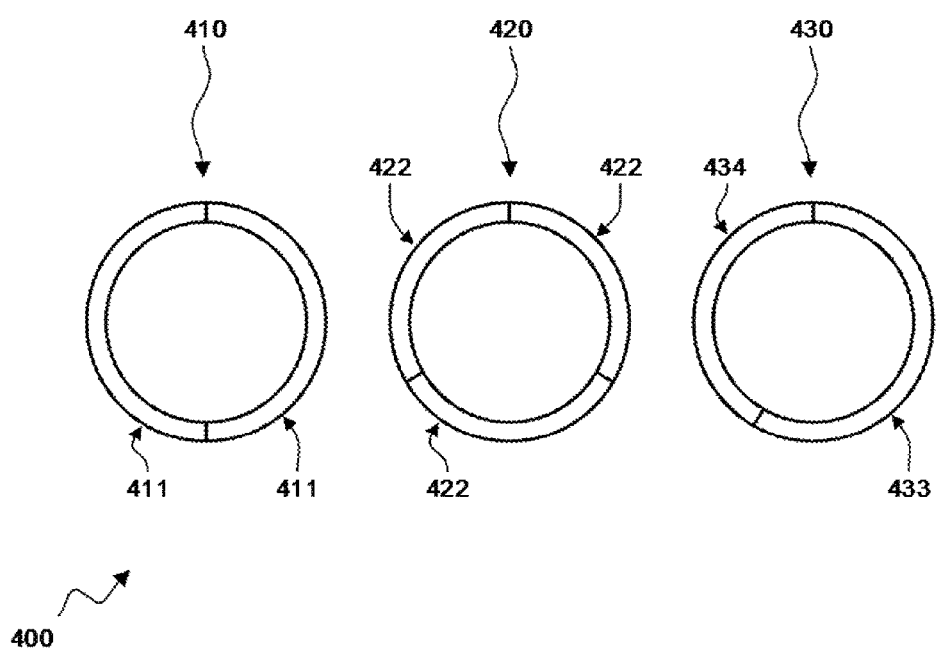
FIG. 4 illustrates exemplary indenter embodiments.

FIGS. 4-8 illustrate additional exemplary indenter embodiments 400. FIG. 4 illustrates exemplary multipiece indenter embodiments. Each multipiece indenter embodiment includes two or more segments, with each segment filling a portion of an arc, up to and including a full 360° arc. In other exemplary embodiments, indenter 410 has two same-length segments 411. Another exemplary embodiment 420 has three same-length segments 422. Yet another exemplary embodiment 430 has two different-length segments 433 and 434. Using multiple pieces makes fabrication by wire bending easier by eliminating the need to bend the wire past itself. A multipiece indenter also improves friction fit in a rimmed washer 121 by allowing wire ends to be match ground to achieve an indenter major outside diameter 539 (FIG. 5) that more closely matches the washer rim inside diameter 126 (FIG. 5), which can vary due to manufacturing tolerances. Other numbers of segments, of the same or different length(s) can be used without departing from the scope of the present subject matter.

In certain exemplary multipiece indenters 430, friction is created between the indenter and rimmed washer using individual indenter segments with a slightly oversize bend radius of curvature and/or using an outside circumference slightly larger than the inside circumference of the rimmed washer. Segments 432 or 433, for example, are compressed and mated to the inside radius of rim 122. If a segment comprises more than 180° of the total indenter 430, spring force holds the segment in place. To achieve an oversize length in certain exemplary embodiments, one or more indenter segments ends are match machined to an outside circumference slightly larger than the rim inside circumference to produce an interference fit with the rim. When the last segment is installed in rimmed washer 121, this interference creates a force between and among indenter segments and rim 122, giving rise to friction between all the components and keeping them in place. In certain exemplary embodiments, a plurality of segments have the same curvature radius surface. In other exemplary embodiments, the plurality of segments have at least two different curvature radii. These curvature radii are measured where the indenter contacts at least one of the first and second surfaces in the exemplary embodiments above, but they need not be. Other measurement locations can be used without departing from the scope of the present subject matter.

Figure 5:
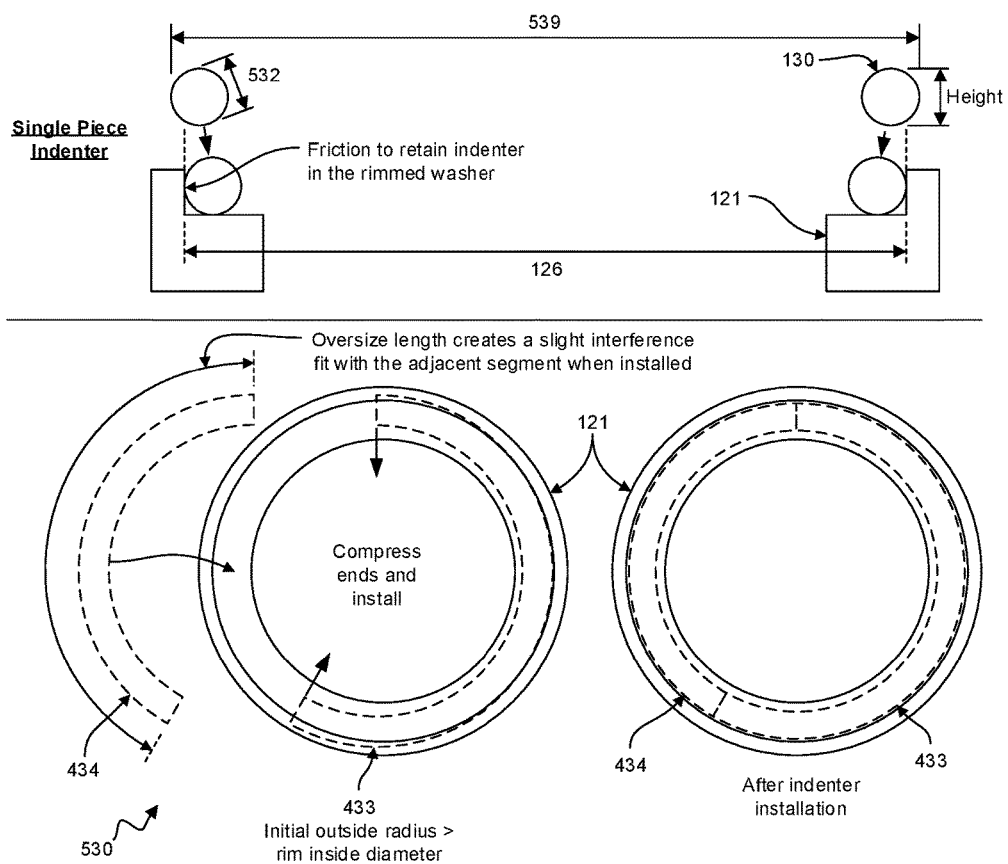
FIG. 5 illustrates exemplary embodiments of friction-fit indenters.

FIG. 5 illustrates an exemplary embodiment of a friction-fit indenter 530. In the exemplary embodiment of FIG. 5, the indenter 530 includes a minor diameter 532 small enough to fit under a load bearing portion of fastener head (not shown) but sized to provide suitable indents over the range of expected loads. For example, one embodiment could be designed for a 0.75×10 UNC socket head cap screw that experiences loads ranging from 1,500 lbf to 11,000 lbf. This embodiment could employ washers made from annealed UNS S30300 round bar and hardened stainless steel indenters. Under these conditions, the indenter could include employ a minor diameter of 0.080 inches, for which a correlation curve can be created for indent widths ranging from 0 mils to 25 mils. If a major diameter of 0.905 inches is employed, the resulting circumference is approximately 2.843 inches and the expected indenter loading is 0.5 lbf/mil to 4 lbf/mil. Based on the above discussed correlation curve, this range of loadings could result in indent widths ranging from 0.5 mils to 21 mils. These parameters are exemplary only, as other parameters known to those of skill in the art can be used without departing from the scope of the present subject matter.

In the exemplary embodiment of FIG. 5, indenter 530 is held in place in rimmed washer 121 using friction between the indenter major outside diameter 539 and rim inside diameter 126. A friction fit is created by forming indenter 530 with a major outside diameter 539 slightly oversize compared to rimmed washer inside diameter 126. Insertion of indenter 530 in rimmed washer 121 forms an interference fit, resulting in radial load and friction between pieces. In certain exemplary embodiments, friction-fit indenters 530 are fabricated to a desired oversize condition and match machined, sanded, and/or ground to a desired major outside diameter 539. The friction fit indenter 530 includes pieces 433 and 434, but other numbers of pieces of the same or different size(s) can be used without departing from the scope of the present subject matter.

Figure 6:
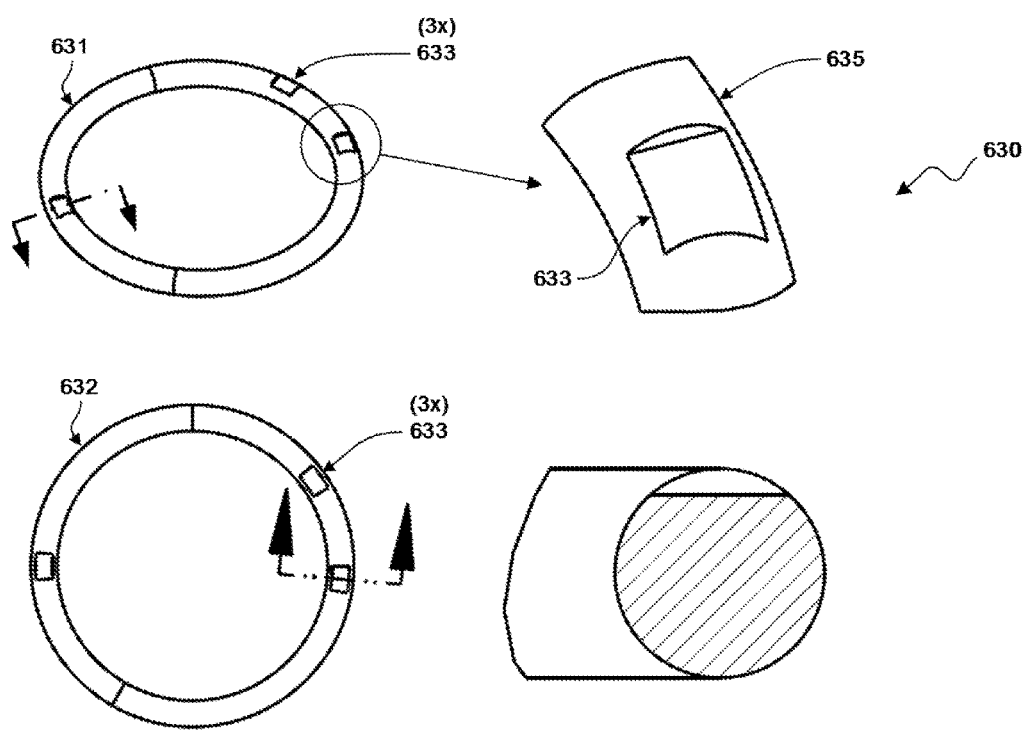
FIG. 6 illustrates exemplary embodiments of grooved indenters.
Figure 7:
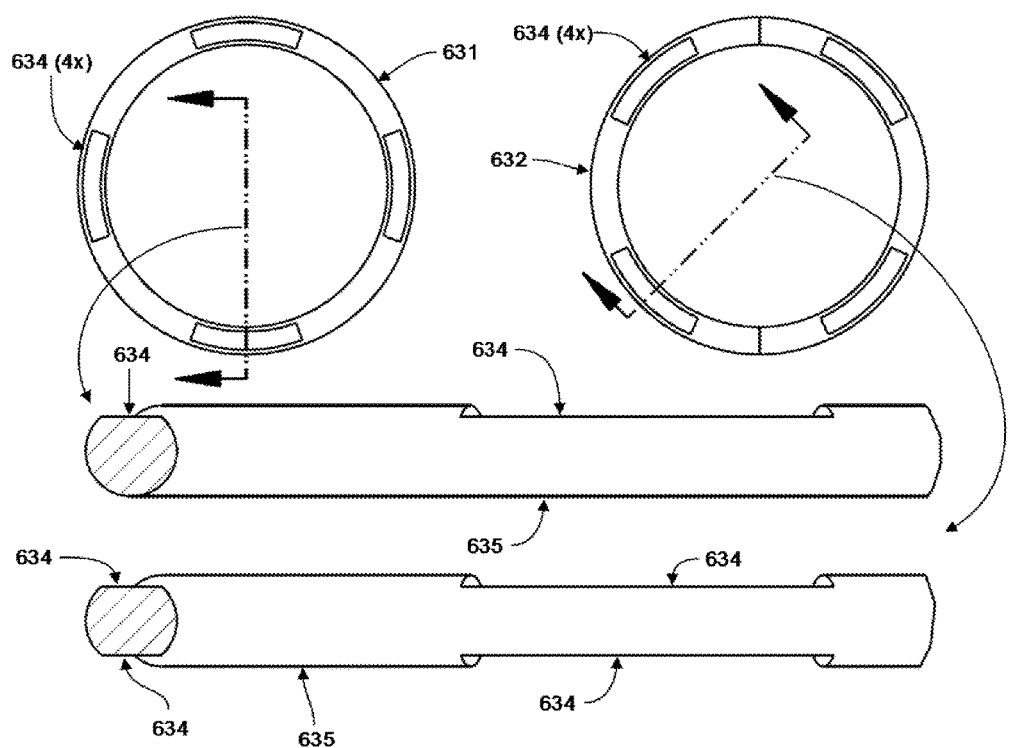
FIG. 7 illustrates additional exemplary embodiments of grooved indenters.

FIGS. 6 and 7 illustrate exemplary embodiments of grooved indenters 630. These exemplary embodiments have a first indenter region 631, a second indenter region 632, and one or more narrow grooves 633, wide grooves 634, or some combination of both. In these exemplary embodiments, grooves are included in one or both indenter regions 631/632 to prevent indenter 630 from contacting at least a portion of first or second surfaces 110/120. When multiple fasteners (not shown) are monitored, a groove pattern (not shown) can be used in one or more indenters 630 to provide a correlation between indenter 630 and at least one of first surface 110 and second surface 120. Grooves can be on one or both indenter regions 631/632 of indenter 630. A groove is considered narrow based on the ability of the indenter 630 to redistribute load underneath the groove. If indenter 630 has a narrow groove 633 on one surface and no groove on another surface (including but not limited to an adjacent surface), indenter 630 will redistribute the compression load such that an ungrooved adjacent region 635 of indenter 530 indents at least one of opposing washers 111 and 121.

In the exemplary embodiment of FIG. 6, narrow grooves 633 are used for identification. Narrow grooves 633 create ungrooved regions 635 where indenter 630 does not contact at least a portion of first or second surfaces 110/120 and does not create an indentation 140 in uncontacted portions of first or second surface 110/120 when loaded. In certain exemplary embodiments, grooves 633 and/or 634 prevent indenter 630 from contacting at least one of washers 111 and 121, resulting in at least one corresponding unindented region in washer 111 and 121. The location of the at least one unindented region reveals how indenter surface 631 and/or 632 was orientated with respect to washers 111 and/or 121 when loaded. The exemplary embodiment of FIG. 6 has narrow grooves 631 on the portion of indenter 630 facing unrimmed washer 111 for identification/orientation purposes. In this exemplary embodiment, indenter orientation with respect to rimmed washer 121 is indicated by making narrow grooves 633 in washer rim 122 adjacent to at least one other groove 633/634. Such an orientation is exemplary only, as other groove orientations can be used without departing from the scope of the present subject matter.

FIG. 7 illustrates an exemplary indenter 630 with wide grooves 634. Wide grooves 634 increase average load on the indenter ungrooved region(s) 635. Wide grooves are grooves sized such that a load cannot fully redistribute around the grooves. If indenter 630 has a wide groove 634 on one surface and no groove on an adjacent surface, indenter 630 will not fully redistribute the load such that the adjacent ungrooved region 635 of indenter 530 does not fully indent at least one of opposing washers 111 and 121. A wide groove 634 creates one or more ungrooved indenter regions 635 where the indenter 630 does not contact at least a portion of first surface 110 and/or second surface 120. This concentrates load on a smaller portion of indenter 630, leading to higher loads per unit length of the remaining indenter contact, resulting in higher stresses on portions of first surface 110 and/or second surface 120 in contact with ungrooved region(s) 635. This reduces the minimum load that can be detected to a value below the value that can be detected using an ungrooved indenter, increasing the range of detectable loads. Wide grooves 634 can be located on one or both sides of the indenter 630.

Figure 8:
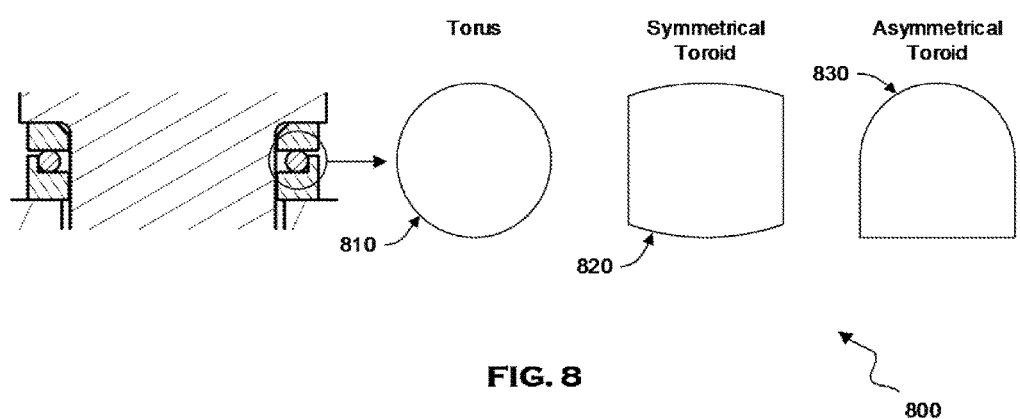
FIG. 8 illustrates exemplary embodiments of toroidal indenters.

FIG. 8 illustrates exemplary embodiments of toroidal indenters 800. Specifically, FIG. 8 illustrates an exemplary torus indenter 810, a symmetrical toroid indenter 820, and an asymmetrical toroid indenter 830. In an exemplary embodiment of FIG. 8, indenter 810 has a circular cross section, while toroid-shaped indenters 820 and 830 have non-circular cross sections. The use of noncircular cross sections permits independent control of indenter height and indentation surface shape. A symmetrical toroidal indenter 820, for example, may have an indentation surface diameter larger than the indenter height. This permits the design of a high-load washer set (where a large indenter radius of curvature is desirable) for applications with restrictive fastener height constraints (where, for example, a torus-shaped indenter would be too tall). An asymmetrical toroidal indenter 830 creates an indentation 140 on at least one of first and second surfaces 110/120. This could be used in situations where test or design parameters constrain the material choices for at least one of the surfaces (or at least one of the washers in embodiments where at least one of the surfaces is on a washer), restricting it to a material that is too soft to support a circular indenter cross section at an expected load. A first surface can be curved on an indenter side facing the surface to be indented, while a flat surface could be used for the surface not being indented. Although this exemplary embodiment illustrates torus and toroidal shapes, other shapes can be used without departing from the scope of the present subject matter. Moreover, the relative dimensions shown for 810, 820, and 830 are exemplary only and not limited to what is shown.

Figure 9:
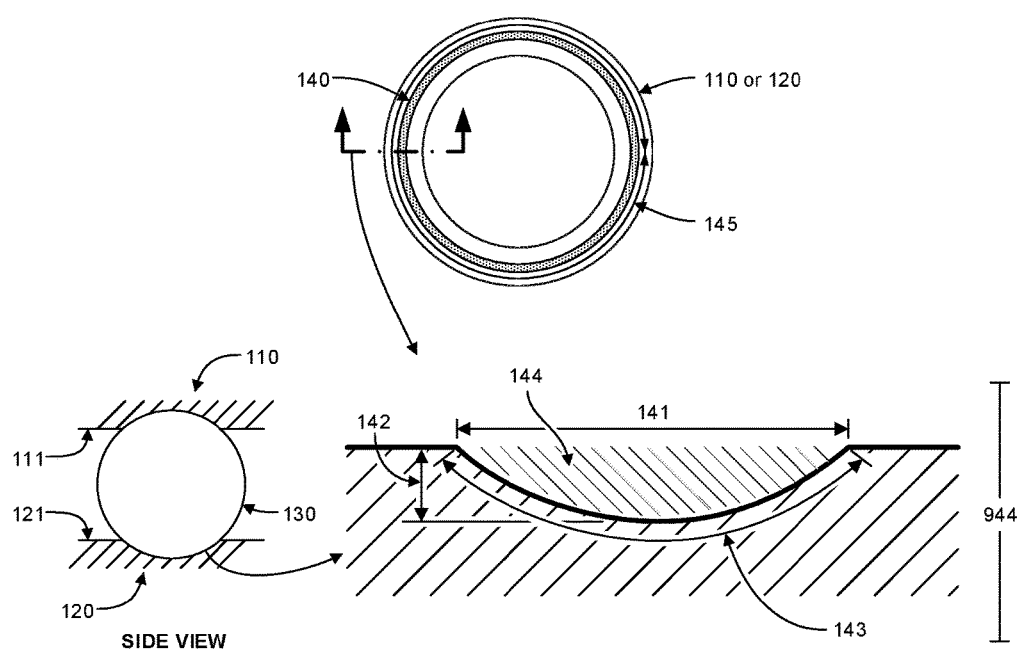
FIG. 9 illustrates exemplary indentation measurement options.
Figure 10:
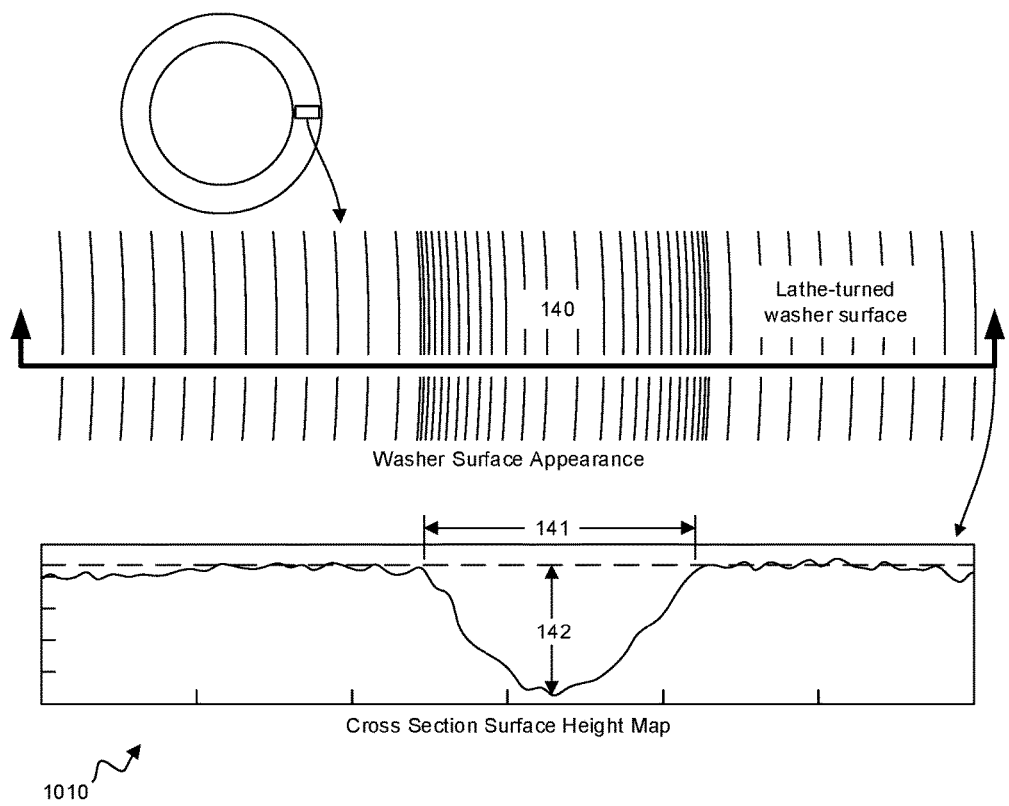
FIG. 10 illustrates an exemplary indentation profile.
Figure 11:
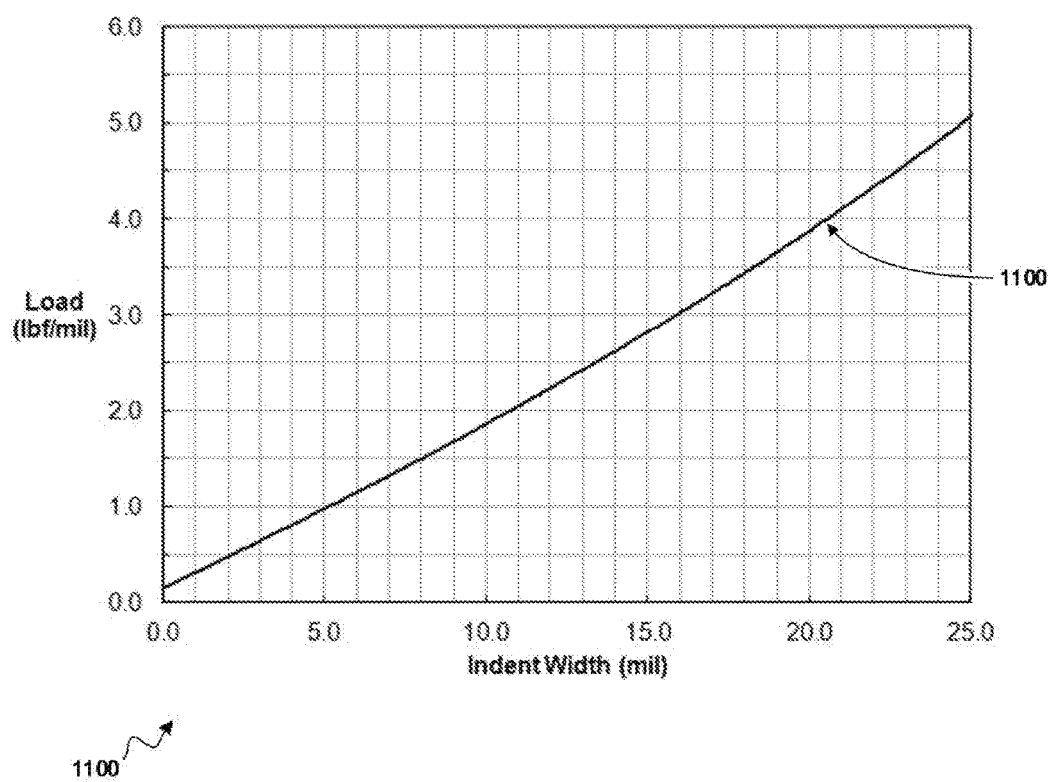
FIG. 11 illustrates an exemplary correlation curve.

FIGS. 9-11 illustrate an exemplary method of measuring a peak load. FIG. 9 illustrates exemplary indentation parameters that can be measured to calculate a peak load. In the embodiment of FIG. 9, an indentation cross section 944 approximates a circular segment. The general size of this indentation 140 is related to the normalized load applied to an indenter (not shown). In this exemplary embodiment, normalized load is the total load applied to the indented surface divided by the circumferential length of indentation 140. Larger normalized loads typically result in larger indentations 140. Examples of indentation parameters that can be measured include but are not limited to indentation width 141, depth 142, radial chord length 143, and/or cross section area 144. Within the sensitive load range of the indented surface, at least one of values 141-145 increases with increasing load and remains constant when a lower load or no load is applied to indenter 130. After removal of at least one of the first and second surfaces 110/120 from load carrying service, the value of at least one of parameters 141-145 correlates to a peak load applied to the indenter during the period of load carrying service.

FIG. 10 illustrates an exemplary indentation profile 1010. In this example, an indentation 140 is scanned with a profilometer (not shown), from which an optical image and surface height map is generated. In certain exemplary embodiments, the indentation profile 1050 is generated from at least one of the optical image and surface height map and used to measure at least one dimensional parameter discussed above. Only width 141 and depth 142 are illustrated in FIG. 10, though other indentation parameters can be used to create an indentation profile without departing from the scope of the present subject matter. Another exemplary method includes physically cross sectioning the indented surface and observing the cross section with a microscope. Yet another exemplary method includes measuring the height indenter 130 and either washer 111 or washer 121 both before and after the load application. In this exemplary method the difference in height between the measurements taken before and after load application represents the indentation depth 142. These and other methods known to those of skill in the art may be used to generate a surface height map without departing from the scope of the present subject matter.

FIG. 11 illustrates an exemplary correlation chart 1100. In certain embodiments, peak load is determined by measuring at least one indentation dimension and correlating that dimension to a known load using a correlation curve 1110. In certain exemplary methods, a peak load is determined by converting at least one indentation dimension to a load-per-length value using a correlation curve 1110 and, for example, integrating over circumferential indentation length 145. In certain exemplary embodiments, correlation curve 1110 is made by performing multiple indenter loadings under different known loads. In certain exemplary embodiments, known normalized loads (load per unit of indent length) applied to one or more correlation washers (the "standards") are plotted against one or more of indent dimensions 141-145 to create a correlation curve. In certain exemplary embodiments, a correlation chart 1100 is used to convert at least one indentation dimension to a normalized load. The embodiment of FIG. 11 illustrates an exemplary correlation curve 1110 that is a normalized load curve. Other curves known to those of skill in the art can be employed without departing from the scope of the present subject matter. In certain embodiments, for example, a correlation chart 1100 is created using measurement standards. With measurement standards, a correlation curve 1110 is created by measuring indentations 140 in standards that were indented with known loads. The indentations 140 are formed using an indenter 130 and first surface 110 and second surface 120 with material properties matching those of the material(s) used in the peak load indicator 100. Since temperature can affect material properties, and thus impact the size of indentation 140, certain exemplary methods employ standards indented at a temperature similar to a temperature used with peak load indicator 100.

If a peak load indicator 100 is used at a temperature for which no correlation curve has been made, curves at two or more other temperatures can be used to interpolate or extrapolate a curve for a desired temperature. In this exemplary method, a sensitive normalized load range of a peak load indicator 100 is determined by a correlation curve 1110. The bottom of the range is the minimum value for which a measurable permanent plastic indentation 140 results. The top of the range is the value at which a given indentation dimensional parameter no longer changes significantly with increasing load. The total load experienced is found by measuring the indentation 140 at several locations around its circumferential length and calculating a normalized load (load per unit length) using the correlation curve.

In certain embodiments, peak load is found by integrating normalized load over the indentation circumferential length. For example, if the indentation is measured at eight uniformly spaced locations around its circumferential length, then the normalized load calculated at each location is multiplied by one eighth of the total circumferential length to find the local load contribution and the local contributions are summed. In other exemplary embodiments, one or more mathematical modeling techniques, such as finite element modeling, are used to predict the load-indentation relationship. In finite element modeling, a computer model of the indentation process is used to predict the relationship between an indent dimensional parameter and an applied load.

Peak load indicator assemblies 100 do not have to be observed during load application. After a test, indicator assembly 100 can be removed and disassembled so that at least one of an indentation width 141, indentation depth 142, indentation radial chord length 143, and/or indentation cross section area 144 can be measured. This is advantageous when a fastener 10 is in a hostile or normally inaccessible location. Non-limiting examples of where they may be used include hostile or inaccessible locations, locations where external wires cannot be introduced (such as in rotating assemblies), and locations where cable exit options are difficult to implement (such as, for example, when a penetrating a pressure boundary). Certain exemplary embodiments include materials that generally withstand any environment for which the fastener 10 can withstand. This includes but is not limited to high-temperature, high-pressure, high-radiation, and/or aqueous environments. These environmental factors can damage alternate sensors having semiconductor devices, special materials like magnets or piezoelectrics, or incompatible materials such as low temperature alloys or materials that are soluble in an aqueous measurement environment.

In certain exemplary embodiments fastener 10 and peak load indicator assembly 100 are removed and disassembled after the load exposure is complete so that at least one indentation dimension (including, for example, indentation width 142, indentation depth 142, indentation radial chord length 143, and/or indentation cross-sectional area 144) can be measured. Since larger loads result in larger indentations 140 at a given temperature, the largest indentation 140 is typically made by the largest load experienced by the peak load indicator 100. The indentations 140 are shown as the same size in the exemplary embodiment of FIG. 2, but need not be. If temperature varies during the test, further evaluation can be optionally performed, as indentation dimensions in certain materials vary with temperature. As loading can vary around an indentation, in certain embodiments measurements are taken at multiple locations on an indentation, with one or more of these measurements converted to load/length, and integrated around the indentation.

It will be understood that many additional changes in the details, materials, steps and arrangement of parts, which have been herein described and illustrated to explain the nature of the subject matter, may be made by those skilled in the art within the principle and scope of the invention as expressed in the appended claims.

We claim:

1. A peak load indicator, comprising:
   a first surface of a first object having a first yield strength and a first elastic modulus;
   a second surface of a second object having a second yield strength and a second elastic modulus; and
   an indenter configured to form an indentation profile in at least a portion of at least one of the first surface and the second surface and disposed between and in direct contact with at least a portion of both the first surface and the second surface,
   the indenter having a third yield strength greater than a greater of the first and second yield strengths and a third elastic modulus greater than a greater of the first and second elastic moduli; and
   at least one groove on a surface of the indenter,
   the at least one groove configured to prevent at least a portion of at least one of the first surface and the second surface from contacting the indenter.

2. The peak load indicator of claim 1, wherein the first surface is a first washer and the second surface is a second washer.

3. The peak load indicator of claim 2, wherein the first washer and the second washer are different materials.

4. The peak load indicator of claim 2, wherein the first washer is an unrimmed washer and the second washer is a rimmed washer having a cylindrical recess.

5. The peak load indicator of claim 4, wherein:
   the unrimmed washer is concentrically on top of the indenter; and
   the indenter is between the rimmed washer and the unrimmed washer.

6. The peak load indicator of claim 4, wherein the indenter is in the rimmed washer cylindrical recess.

7. The peak load indicator of claim 6, wherein a friction fit retains the indenter in the rimmed washer recess.

8. The peak load indicator of claim 1, wherein the indenter has a shape selected from the group consisting of a torus, a symmetrical toroid, and an asymmetrical toroid.

9. The peak load indicator of claim 8, wherein the indenter further comprises a plurality of segments forming an arc.

10. The peak load indicator of claim 9, wherein the plurality of segments have a same curvature radius.

11. The peak load indicator of claim 9, wherein the plurality of segments have at least two different curvature radii.

12. The peak load indicator of claim 1, wherein the indenter further comprises at least one flat surface region.

13. The peak load indicator of claim 1, further comprising at least one groove on at least one of the first and second surfaces.

14. The peak load indicator of claim 1, further comprising a first coating on at least one of the first surface, the second surface, and the indenter.

15. The peak load indicator of claim 14, further comprising a second coating different from the first coating on at least one of the first surface, the second surface, and the indenter.

16. The peak load indicator of claim 1, wherein at least one of the first surface, the second surface, and the indenter has a different microstructure.

17. A method of measuring a peak load, comprising the steps of:
    forming an indentation profile with an indenter in at least one of a first surface and a second surface, the indentation profile including at least one of an indentation width, an indentation depth, indentation radial chord length, and an indentation cross sectional area;
    measuring at least one of the indentation width, the indentation depth, indentation radial chord length, and the indentation cross sectional area of the indentation profile; and
    correlating an applied load to a largest of the at least one indentation width, indentation depth, indentation radial chord length, and indentation cross sectional area of the indentation profile;
    wherein the indenter is between the first surface and the second surface and has at least one groove on a surface of the indenter, and
    the at least one groove is configured to prevent at least a portion of at least one of the first surface and the second surface from contacting the indenter.

18. The method of claim 17, wherein the peak load is a compressive load.

19. A method of measuring a peak load, comprising the steps of:
    placing an indenter between a first surface and a second surface, the indenter having at least one groove on a surface of the indenter, the at least one groove configured to prevent at least a portion of at least one of the first surface and the second surface from contacting the indenter;
    exerting a load on at least one of the first and second surfaces;
    forming an indentation in at least one of the first and second surfaces;
    measuring a largest of at least one of a width, depth, radial chord length, circumferential length, and cross-sectional area of the indentation formed by the indenter in at least one of the first and second surfaces; and
    converting the measured parameter into a load value.

20. The method of claim 19, further comprising the steps of:
    converting the measured parameter into a load per length value; and
    obtaining a load value by integrating along a circumferential length of the indentation.

21. The method of claim 20, wherein the exerted load is a compressive load.

* * * * *